United States Patent [19]
Kuno

[11] Patent Number: 5,241,595
[45] Date of Patent: Aug. 31, 1993

[54] COMMUNICATION CONTROL SECTION FOR FACSIMILE EQUIPMENT HAVING A SECURE COMMUNICATION FUNCTION

[75] Inventor: Hiroshi Kuno, Oogaki, Japan

[73] Assignee: Brother Kogyo Kabushiki Kaisha, Nagoya, Japan

[21] Appl. No.: 720,377

[22] Filed: Jun. 25, 1991

[30] Foreign Application Priority Data

Jul. 25, 1990 [JP] Japan .................................. 2-194968

[51] Int. Cl.⁵ .............................................. H04N 1/44
[52] U.S. Cl. ......................................... 380/18; 380/9;
 380/10; 380/21; 380/43; 380/49; 380/50;
 379/93; 379/100; 358/443; 358/468
[58] Field of Search ................... 380/9, 10, 18, 21, 43,
 380/49, 50, 20; 358/443, 468; 379/93, 95, 100

[56] References Cited

U.S. PATENT DOCUMENTS

| | | | |
|---|---|---|---|
| 4,091,423 | 5/1978 | Branscome | 380/18 |
| 4,297,727 | 10/1981 | Ogawa et al. | 358/261.4 |
| 4,989,244 | 1/1991 | Naruse et al. | 380/20 |

OTHER PUBLICATIONS

A. G. Konheim, *Cryptograhy, A Primer*, (John Wiley & Sons, Inc.; 1981; Section 7.4, pp. 288-292).

*Primary Examiner*—Bernarr E. Gregory
*Attorney, Agent, or Firm*—Oliff & Berridge

[57] ABSTRACT

A facsimile equipment including a memory for storing a cipher key data, ten number keys for inputting the cipher key data, a DTMF signal receiving circuit for converting a DTMF signal received through a telephone line into the cipher key data, a controller for controlling the memory to selectively store the cipher key data input by means of the ten number keys or the cipher key data converted by the DTMF signal receiving circuit, a DTMF signal generating circuit for converting the cipher key data stored in the memory into a DTMF signal and generating this DTMF signal to the telephone line, and a controller for scrambling an image data to be transmitted with the cipher key data stored in the memory to provide the transmission data and for descrambling the scrambled image data received with the cipher key data stored in the memory to provide the reception data.

16 Claims, 4 Drawing Sheets

Fig.2B

| S1 | CIPHER MODE INSTRUCTION KEY DEPRESSED ? |
|---|---|
| S2 | CIPHER KEY DATA REGISTRATION MODE |
| S3 | CIPHER MODE INSTRUCTION KEY DEPRESSED ? |
| S5 | CIPHER KEY DATA RECEIVED ? |
| S6 | CIPHER KEY DATA TRANSMISSION INSTRUCTED ? |
| S7 | DIAL NUMBER DESIGNATED BY TEN-KEY ? |
| S8 | DIALING |
| S9 | READ REGISTERED CIPHER KEY DATA, CONVERT THE SAME INTO DTMF SIGNAL, AND OUTPUT THE DTMF SIGNAL |
| S51 | CIPHER KEY DATA RECEPTION PROCESSING |
| S52 | NECESSARY DIGITS OF DTMF SIGNAL INPUT ? |
| S53 | ERROR ? |
| S54 | STORE CIPHER KEY DATA |
| S55 | ERROR PROCESSING |

COMMUNICATION CONTROL SECTION FOR FACSIMILE EQUIPMENT HAVING A SECURE COMMUNICATION FUNCTION

BACKGROUND OF THE INVENTION

1. Field of the Invention

The present invention relates to facsimile equipment enabling secure communications.

2. Description of the Related Art

Conventionally, there exists facsimile equipment that secures the clear text communication by allowing transmission only between machines that recognize a password transmitted at the beginning of the message. This is known as a password communication function.

In the password communication function, operators on the transmitter side and the receiver side arrange, ahead of the facsimile communication, to use the same password. The arrangement may be made by telephone, mail or other communication means. The operators individually input the same password into the respective facsimile equipments, thus making the password on the transmitter side accord with the password on the receiver side, so that the message is only transmitted to a machine that recognizes and accepts the lead password.

Thus, the password communication function permits communication only between parties having the same password resident in their facsimile equipment. Accordingly, in the event that either operator makes an error in setting the password, communication between the parties becomes impossible.

SUMMARY OF THE INVENTION

It is an object of the present invention to provide facsimile equipment which can prevent the inability to communicate as a result of having different passwords by using cipher key data in a secure communication, the cipher key data corresponding to, and replacing, the password in the password communication and making the cipher key data on the transmitter side completely match with the cipher key data on the receiver side. In addition, the cipher key data is used to scramble the message text unlike the password communications that transmit clear text messages.

The facsimile equipment of the present invention comprises a memory means for storing the cipher key data, an input means for inputting a cipher key data to set the same, a reception converting means for converting a dual tone multi-frequency (DTMF) signal received through a telephone line into cipher key data, a control means for controlling the memory means to selectively store the cipher key data input by the input means or the cipher key data converted by the reception converting means, a transmission converting means for converting the cipher key data stored in the memory means into a DTMF signal and then generating this DTMF signal to the telephone line, a scrambling means for scrambling an image data to be transmitted and the cipher key data stored in the memory means to provide a transmission data, and a descrambling means for descrambling the image data received and the cipher key data stored in the memory means to provide a reception data.

With this apparatus, the image data in the telephone line during the transmission is scrambled with the cipher key data. Therefore, even though the scrambled image data is intercepted from the telephone line, the interceptor cannot determine the original, or unscrambled, image data from the intercepted scrambled image data. Thus, the image data in the telephone line is kept secure or secret.

Further, the cipher key data stored in the memory means in the facsimile equipment on the transmitter side is identical with the cipher key data stored in the memory means in the facsimile equipment on the receiver side.

It makes no difference whether the facsimile equipment on the transmitter side or the receiver side is used to set the cipher key data. That is, the cipher key data may be set on either piece of facsimile equipment, and the cipher key data set above on one side is identical with the cipher key data on the other side so long as it is transmitted from the setting to the other piece of facsimile equipment. As a result, unlike in the password communication function, there is no possibility of discordance between the cipher key data on the transmitter side and the cipher key data on the receiver side.

The transfer of the cipher key data to the receiver is carried out by converting the cipher key data into a DTMF signal and transmitting the DTMF signal through a telephone line to the receiver. Accordingly, operators on the transmitter side and the receiver side do not need to arrange, ahead of time, the cipher key data by other communication means such as telephone or mail. Thus, the secure communication can be efficiently carried out with ease and certainty without any additional problems or effort.

BRIEF DESCRIPTION OF THE DRAWINGS

The present invention will be described with reference to the drawings, in which:

FIG. 2B is a table of labels for the flowchart of FIG. 2A; and

DESCRIPTION OF THE PREFERRED EMBODIMENT

Figure 1:
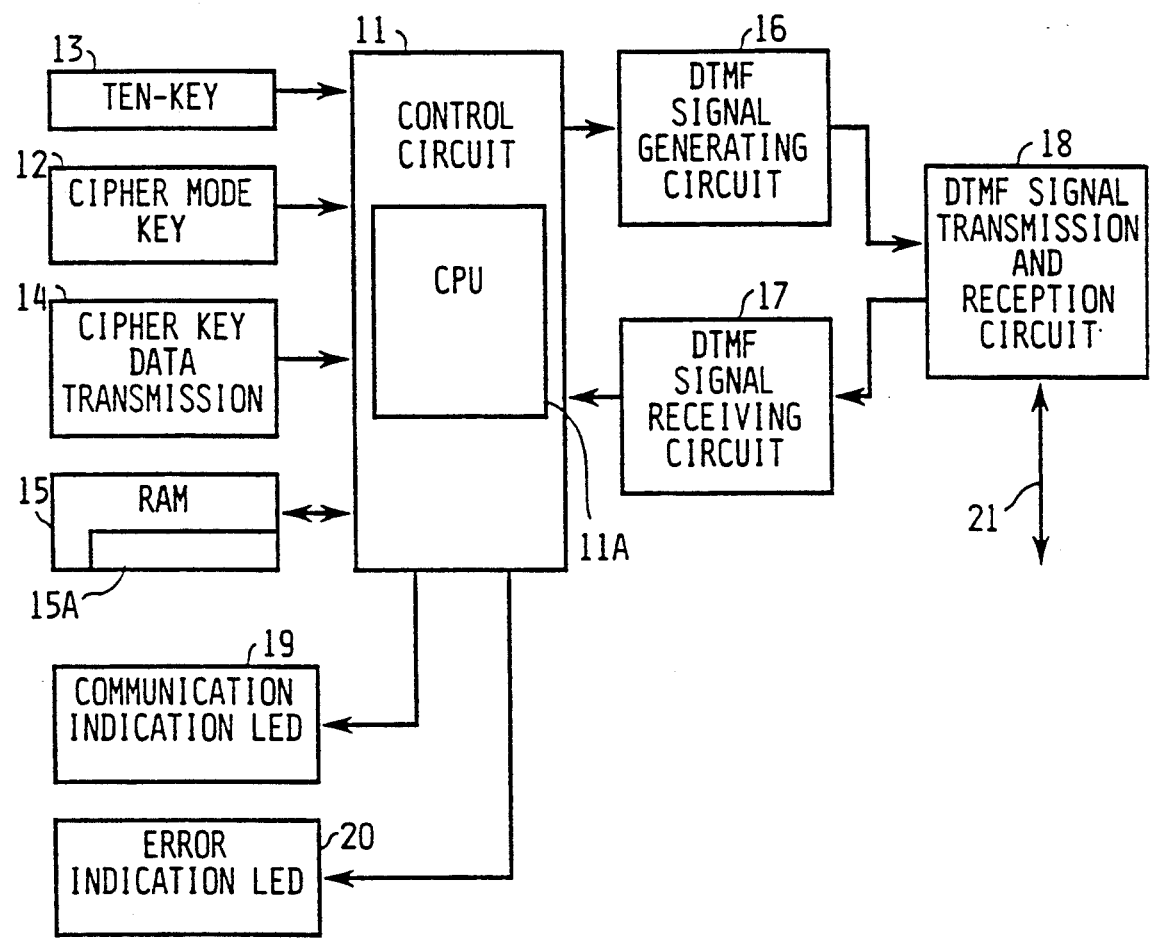
FIG. 1 is a block diagram showing the structure of a communication control section in facsimile equipment according to a preferred embodiment of the present invention.

FIG. 1 is a block diagram showing the structure of the preferred embodiment of the present invention. A control circuit 11 has a microcomputer (CPU) 11A for adding a parity code to a cipher key data (in this preferred embodiment, a parity code added to a cipher key data will be referred also to as cipher key data), decoding a received cipher key data, and controlling cipher key data transmission and cipher key data reception. The control circuit 11 is supplied with an output from a cipher mode key 12 for instructing a cipher key data transmission and reception mode, an output from a ten-key 13 corresponding to the ten numerals of 0 to 9 for setting cipher key data, and an output from a cipher key data transmission key 14 for instruction transmission of cipher key data. A cipher key data set creating using the ten-key 13 is stored into a buffer area 15A of RAM 15 and the cipher key data stored in the buffer area 15A is read out under the control of the control circuit 11. The cipher key data output from the control circuit 11 is converted into a DTMF signal by a DTMF signal generating circuit 16, and the DTMF signal is transmitted to another facsimile equipment by the DTMF signal transmission and reception circuit 18. A DTMF signal, transmitted from another's facsimile equipment, when received is converted into cipher key data by a DTMF signal receiving circuit 17 and the received cipher key data is supplied from the DTMF signal receiving circuit 17 to the control circuit 11. The DTMF signal generating circuit 16 and the DTMF signal receiving circuit 17 are connected to a DTMF signal transmission and reception circuit 18 which is in turn connected to a telephone line 21. A communication indication light emitting diode (communication indication LED) 19 is driven by an output from the control circuit 11 to indicate that cipher key data is being communicated. An error indication light emitting diode (error indication LED) 20 is also driven by an output from the control circuit 11 to indicate error detection.

Figure 2A:
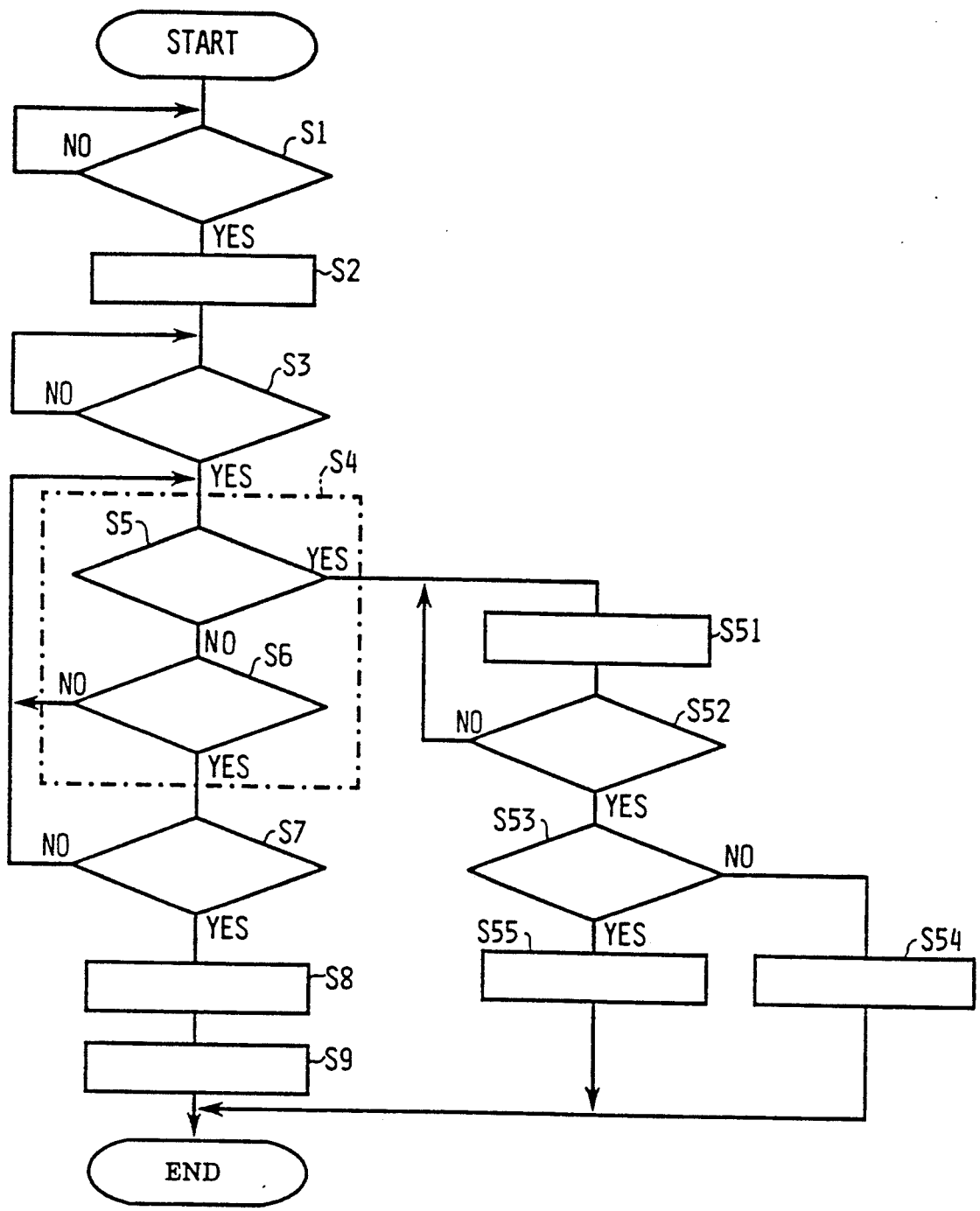
FIG. 2A is a flowchart showing the process of transmission and reception of cipher key data.
Figure 3:
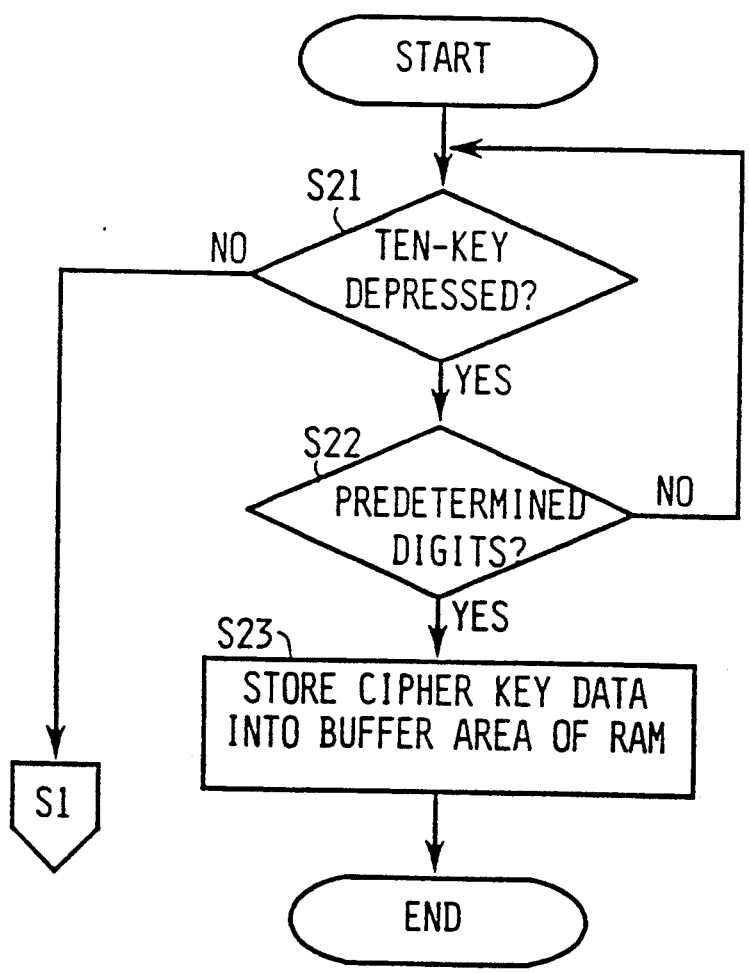
FIG. 3 is a flowchart showing the process of registration of a cipher key data.

In the facsimile equipment described above, the operation of transmission and reception of a cipher key data is described with reference to FIGS. 2A, 2B and 3. Referring to FIGS. 2A and 2B, when the cipher mode key 12 is depressed under a waiting condition (step S1), a cipher key data registration mode is set (step S2). As shown in FIG. 3, when the cipher key data registration mode is set, the ten-key 13 serves as keys for inputting a cipher key data. When the numeral keys of the ten-key 13 are randomly depressed a predetermined number of times (e.g., sixteen times) corresponding to the required number of digits to create the cipher key data, the cipher key data for securing the transmission, consisting of sixteen digits, is created (steps S21 and S22). The designated cipher key data is stored into the buffer area 15A of the RAM 15 (step S23) and the cipher key data registration mode is ended.

Referring back to FIGS. 2A and 2B, when the cipher mode key 12 is depressed again after ending the cipher key data registration mode (step S3), a cipher key data transmission and reception waiting mode is set (step S4).

In the cipher key data transmission and reception waiting mode of step S4, when the cipher key data transmission key 14 is depressed (NO in step S5 and YES in step S6), the control circuit waits for the operator to designate a receiver.

In such a waiting condition, where instructions for the designation of the receiver are awaited, the ten-key 13 serves as keys for inputting a telephone number. After the keys of ten-key 13 are depressed to designate the telephone number of the receiver (step S7), dialing is carried out in accordance with the designated telephone number (step S8).

When the telephone line to the receiver is connected by the dialing, the cipher key data stored in the buffer area 15A of the RAM 15 is read out to be input into the control circuit In the control circuit 11, a parity code is added to the input cipher key data according to a predetermined coding system employing a cyclic code, for example. Then, with the parity code added, the cipher key data is output from the control circuit 11 to the DTMF signal generating circuit 16. In the DTMF signal generating circuit 16, cipher key data, including the added parity code (e.g., 18-digit cipher key data including a 2-digit parity code) is converted into a corresponding DTMF signal.

The DTMF signal generated from the DTMF signal generating circuit 16 is input, through the DTMF signal transmission and reception circuit 18, to the telephone line 21 through which it is transmitted to the facsimile equipment on the receiver side (step S9), thus ending the transmission of the cipher key data. During the period of generating the DTMF signal from the DTMF signal generating circuit 16, the communication indication light emitting diode 19 is driven to emit light, so as to indicate that the cipher key data is being transmitted.

In the cipher key data transmission as mentioned above, it is necessary that a cipher key data transmission and reception waiting mode be set in the facsimile equipment on the receiver side in the same manner as on the transmitter side. That is, in the facsimile equipment on the receiver side, the cipher key data transmission and reception waiting mode of step S4 is set by twice depressing the cipher mode key 12. Under such a condition, when the DTMF signal from the facsimile equipment on the transmitter side is received by the facsimile equipment on the receiver side (YES in step S5), the DTMF signal is received by the DTMF signal transmission and reception circuit 18 and then input into the DTMF signal receiving circuit 17 where the received DTMF signal is converted into a corresponding cipher key data having a predetermined number of digits (steps S51 and S52). Then, the cipher key data is input into the control circuit 11 and it is decoded by the control circuit 11. Furthermore, it is determined whether an error has been generated during the communication according to the parity code (step S53). If no error has been generated, the decoded cipher key data is stored into the buffer area 15A of the RAM 15 (step S54) thus ending the input processing of the cipher key data.

On the other hand, if it is determined in step S53 that an error has been generated, error processing is carried out (step S55) to stop the input processing of the cipher key data. During the error processing, the error indication light emitting diode 20 is driven to emit light, so as to indicate that an error has been generated and that error processing is being carried out. In addition, an error signal informing the transmitter that the cipher key data has not been correctly received is transmitted to the facsimile equipment on the transmitter side.

In the case where cipher key data is transmitted from the facsimile equipment on the receiver side when the facsimile equipment on the transmitter side is in the cipher key data transmission and reception waiting mode of step S4, the cipher key data received by the facsimile equipment on the transmitter side is stored into the buffer area 15A of the RAM 15 in the facsimile equipment on the transmitter side by executing the steps S5 to S55 in the same manner as the above case where the cipher key data is received by the facsimile equipment on the receiver side.

As mentioned above, the cipher key data stored in the buffer area 15A of the RAM 15 in the facsimile equipment on the transmitter side is identical with the cipher key data stored in the buffer area 15A of the RAM 15 in the facsimile equipment on the receiver side. Thus, unlike in password communication, there is no possibility of disagreement between the cipher key data on the transmitter side and the cipher key data on the receiver side. Further, even when the transmitter and the receiver are changed, the same effect can be ensured so long as both pieces of facsimile equipment are equipped with the invention. That is, a cipher key data may be transmitted from the facsimile equipment on the receiver side and it may be stored into the buffer area 15A of the RAM 15 in the facsimile equipment on the transmitter side.

Under the above-mentioned condition where the same cipher key data is stored in both pieces of facsimile equipment, that on the transmitter side and that on the receiver side, the communication content is transmitted as scrambled image data from the facsimile equipment on the transmitter side. More specifically, the cipher key data read from the buffer area 15A of the RAM 15 and an original image data to be transmitted are scrambled with each other by an exclusive OR circuit (not shown) in accordance with modulo-two addition and the image data thus scrambled is transmitted.

The facsimile equipment on the receiver side, having received this scrambled image data, reads the cipher key data from the buffer area 15A of the RAM 15, and the received scrambled image data is descrambled with the cipher key data by using an exclusive OR circuit (not shown) in accordance with modulo-two addition. As the cipher key data stored in the facsimile equipment on the transmitter side is identical with the cipher key data stored in the facsimile equipment on the receiver side, the original image data to be transmitted prior to scrambling completely accords with the received image data after descrambling. Furthermore, since the image data in the telephone line during the transmission is scrambled with the cipher key data, an interceptor having intercepted the image data from the telephone line cannot replicate the original image data. Thus, the image data in the telephone line during the transmission is kept in a secure or scrambled condition.

In a modification to the preferred embodiment, the image data to be transmitted may be enciphered prior to placing it into the facsimile equipment, and the enciphered image data may be scrambled. In this case, on the receiver side, the enciphered and scrambled image data received is first descrambled, and then the descrambled enciphered image data must be deciphered. As such, it should be appreciated that the image data in the telephone line during the transmission is kept in a doubly secure condition.

In addition, the control circuit 11 in this preferred embodiment may be included in a control circuit that is part of a microcomputer for controlling the facsimile equipment as a whole.

Further, the registration of a cipher key data may be carried out not by the intercommunication between the facsimile equipment on the transmitter side and the facsimile equipment on the receiver side, but by arranging a cipher key code by mutual agreement between an operator on the transmitter side and an operator on the receiver side and then individually inputting the same cipher key data by the depression of the same numbered keys of the ten-key 13 on both the transmitter side and the receiver side.

Although the present invention has been shown and described in terms of the preferred embodiment, it should not be considered as being limited thereby as the details, such as the number of digits of cipher key data, may be varied without departing from the scope of the invention.

What is claimed is:

1. A communication control section for facsimile equipment, comprising:
   memory means for storing cipher key data;
   cipher key data registration means for converting a signal received through a telephone line into the cipher key data;
   control means for controlling the memory means to store the cipher key data converted by the cipher data key data registration means;
   means for inputting the cipher key data for storing in said memory means; and
   transmission converting means for converting the cipher key data stored in the memory means into a DTMF signal and then generating the DTMF signal to a telephone lien.

2. The communication control section according to claim 1 further comprises scrambling means for scrambling an image data to be transmitted with the cipher key data stored in the memory means to provide a transmission data.

3. The communication control section as claimed in claim 1, wherein said received signal is dual tone multi-frequency (DTMF) signal.

4. The communication control section as claimed in claim 1, wherein said means for inputting the cipher key data comprises a key pad.

5. A communication control section for a facsimile machine, comprising:
   mode selection means for selecting one of a scrambled mode and a plaintext mode;
   memory means for storing a cipher key data set;
   input means for inputting said cipher key data set into said memory means;
   a communications interface for linking the facsimile machine to a communications medium;
   a control means for executing one of scrambling or descrambling input image data with the cipher key data set stored in said memory means.

6. The communication control section as claimed in claim 5, wherein said input means comprises said control means inputting the cipher key data set into said memory means upon receipt from a remote facsimile machine.

7. The communication control section as claimed in claim 5, wherein said input means comprises:
   a ten digit key pad for randomly inputting a predetermined number of digits when the facsimile machine is the transmitter.

8. The communication control section as claimed in claim 7, wherein said predetermined number of digits is sixteen.

9. The communication control section as claimed in claim 7, wherein said control means adds a parity code to said cipher key data set prior to transmitting data to a remote facsimile machine.

10. The communication controls section as claimed in claim 9, further comprising transmission converting means for converting the cipher key data set with added parity code into a DTMF signal and passing said DTMF signal to said communications interface.

11. The communication control section as claimed in claim 10, wherein said transmission converging means converts a received signal into said cipher key data set and parity code when the facsimile machine is in the scrambled mode.

12. The communication control section as claimed in claim 5, further comprising error detection means.

13. A communication control section for a facsimile machine, comprising:
   a transmission/reception interface;
   a signal generating circuit electronically connected to said transmission reception interface;
   a signal receiving circuit electronically connected to said transmission/reception interface;

a mode selection key for selecting between scrambled and plaintext transmission/reception modes;

cipher key data input means for creating a set of cipher key data;

a memory for storing said cipher key data set; and a control unit for electronically connecting said signal generating and receiving circuits, said mode selection key, said cipher key data input means and said memory wherein when the scrambled transmission/reception mode is selected by said mode selection key, said communication control section has the ability to do one of the acts consisting of sending and receiving a cipher key data set and scrambled message data.

14. The communication control section as claimed in claim 13, wherein said cipher key data set and a clear image data are integrated using an exclusive OR circuit in accordance with modulo-two addition during transmission to create the scrambled message data.

15. The communication control section as claimed in claim 13, wherein said signal generating circuit and said signal receiving circuit process dual tone multi-frequency (DTMF) signals.

16. The communication control section as claimed in claim 13, further comprising descrambling means for descrambling reception data using the cipher key data set stored in the memory to provide a descrambled copy from the scrambled message data received.

* * * * *